April 1, 1941. J. E. HALE 2,236,903
TIRE CONSTRUCTION
Filed Aug. 11, 1937
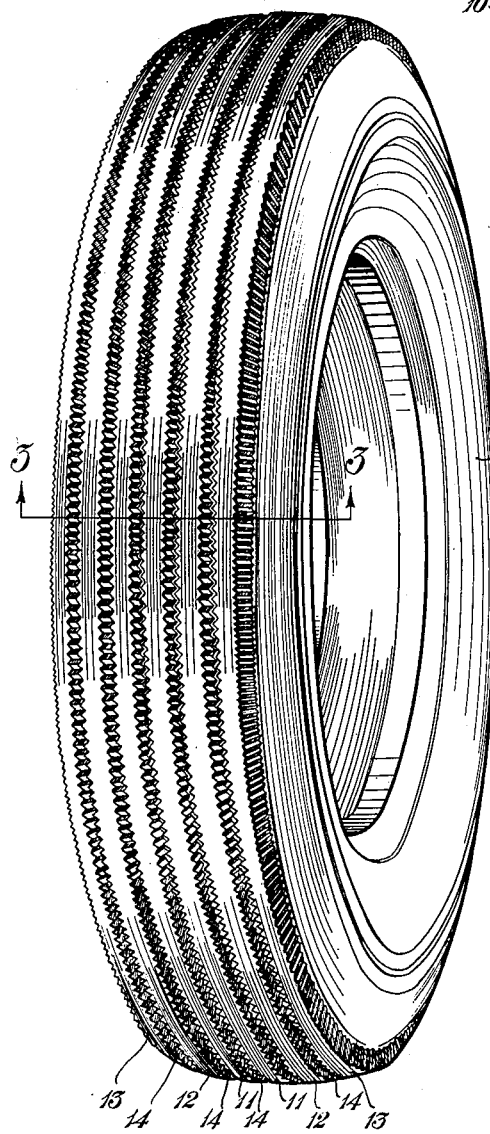
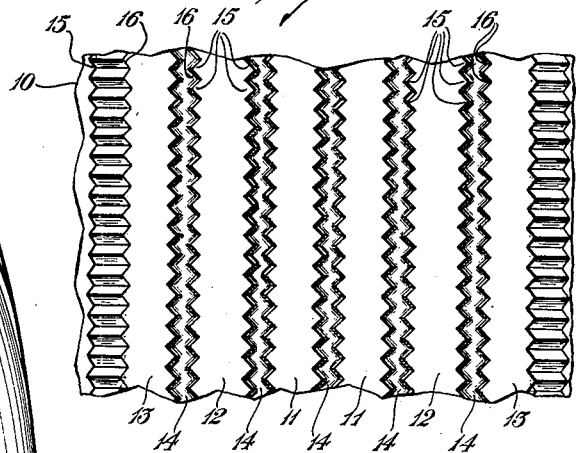
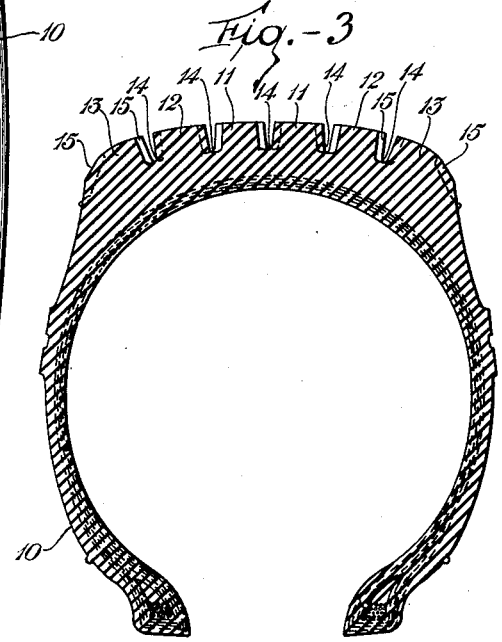
INVENTOR
James E. Hale
BY
ATTORNEY Patented Apr. 1, 1941

2,236,903

UNITED STATES PATENT OFFICE 2,236,903

TIRE CONSTRUCTION

James E. Hale, Akron, Ohio, assignor to The Firestone Tire & Rubber Company, Akron, Ohio, a corporation of Ohio Application August 11, 1937, Serial No. 158,529

2 Claims. (Cl. 152—209)

This invention relates to tire constructions, and more especially it relates to the treads of resilient vehicle tires, particularly the mechanical features thereof.

The tread configurations of non-metallic vehicle tires are adopted with a view to their important mechanical function as well as to their aesthetic appeal. While the primary function of the tread design is to furnish adequate traction, other desirable features require to be considered, among which may be mentioned quietness while running. This is best achieved by treads having continuous circumferential ribs, but such construction does not provide the best traction, it offers but little resistance to oblique skidding, and offers even less resistance to fore and aft skidding. Obliquely disposed ribs offer superior traction and skid resistance, but they frequently are noisy, they often are subject to excessive wear due to wiping action or cupping at their ends, and they frequently define angular or closed recesses from which it is difficult to eject mud or snow.

A further important factor is the wearing quality and stability of the tire tread due to the relative rib widths. If the ribs are too narrow, the tire is unstable and an unpleasant sensation of side sway is noticeable as the automobile is steered about a curve. On the other hand if the ribs are too wide, they lack resistance to lateral skidding, are subject to transverse wiping, and result in undue flexing of the tire cords lying beneath the grooves between the ribs.

The chief objects of this invention are to provide an improved tire tread construction that will be quiet while running; that will resist lateral, oblique, and fore and aft skidding; that will provide adequate traction; that will have no exposed rib-ends or corners to be subjected to wiping action; and that has its tractive elements so arranged that mud will not readily remain in the intervening grooves. A further object is to devise a ribbed tire tread construction with improved stability and wearing quality, and one that will result in eliminating undue flexing of the body of the tire. Other objects will be manifest as the specification proceeds.

Of the accompanying drawing:

Figure 1 is a perspective view of a pneumatic tire casing embodying the invention;

Figure 2 is a fragmentary plan view of the tread of the tire, on a larger scale; and Figure 3 is a section on the line 3—3 of Figure 1.

Referring to the drawing, there is shown a tire casing 10 having the usual cord body and rubber tread portion, the latter comprising a plurality of parallel, unbroken, endless, circumferential center ribs 11, intermediate ribs 12, and shoulder ribs 13, there being circumferential grooves 14 between adjacent ribs. Both lateral faces of each rib are formed with serrations comprising contiguous wedge-shape points 15 and intermediate notches 16, having a saw-tooth formation in longitudinal cross-section, said serrations forming a continuous and uniform succession completely around the tire. A series of serrations is formed at the side of each shoulder rib 13 so as to extend for a short distance down the sidewall of the tire to assist in the skid preventing and traction qualities of the tire. Preferably the two faces that meet to form each point 15 are disposed at an angle of 90° to each other as shown. The depth of the notches 16 and the maximum width of the points 15 is relatively small, so that the serrations constitute but a minor portion of the total width of each rib, and the latter retain all the desirable quiet-running and long-wearing characteristics of the ordinary circumferential ribs. The points 15 extend a substantial distance into the grooves 14, but they do not extend as far as the centerline of the groove so that there is an unobstructed medial region in each groove, as is most clearly shown in Figure 3.

The serrations of the ribs are determinately arranged. Thus the points and notches on one lateral face of each rib are aligned, transversely of the rib, with the respective points and notches on the other lateral face of the rib. The points of each rib, however, are in staggered relation to the points of each adjacent rib transversely of an intervening groove 14. The arrangement gives the grooves 14 somewhat of a zig-zag appearance, but does not alter the width of the groove, said width being uniform throughout the circumference of the tire.

Center ribs 11 are so proportioned that their width is equal to or slightly greater than their height, the height of the rib being considered the same as the depth of groove 14. Intermediate ribs 12 and shoulder ribs 13 are proportionately wider. It is found that the narrow center ribs and relatively wider intermediate and shoulder ribs result in longer wearing life and greater lateral stability of the tread, and also afford a more flexible tread, relieving the cord body of the tire from undue flexing strains. The heavier shoulder rib and intermediate or rider rib are found to provide greater stability, preventing side sway of the tire in cornering. The combination of wide and narrow ribs is found to afford from 15 to 35% added tread wear as compared to treads having ribs of uniform widths or wider ribs in the center. The narrow center ribs and resultant close spacing of the three center grooves result in a more flexible central tread portion to prevent undue wiping and premature wear of the center of the tread. At the same time the added flexibility takes the strain off the cord body of the tire underlying the central grooves when the cord body is subjected to flattening action as the tire rolls along the pavement or reverse bending action as the tire passes over an obstruction in the road.

The tire retains the quiet running characteristics of the ordinary circumferentially ribbed tread since the serrations are not of sufficient size to set up audible noises. The primary advantage of the serrations is to improve the traction of the tread, and greatly to increase its resistance to skidding, especially in oblique and in fore and aft directions. Because of the unobstructed medial region in each groove 14, the presence of the serrations does not greatly increase the tendency of mud to remain in the grooves. The serrations are so arranged as not to be subject to wiping action, wherefore uniform wear transversely of the ribs is assured.

Modification may be resorted to without departing from the spirit of the invention or the scope thereof as defined by the appended claims.

What is claimed is:

1. A tire construction comprising a tread portion formed with a plurality of parallel endless circumferential ribs defining intervening circumferential grooves, the lateral faces of said ribs being uniformly and continuously serrated throughout, the width of said serrations being small as compared to the mean width of said ribs.

2. A tire construction comprising a tread portion formed with a plurality of parallel endless circumferential ribs defining intervening circumferential grooves, the lateral faces of said ribs being uniformly and continuously serrated throughout, said serrations extending into said grooves a distance that is less than half the width of the latter so that the medial region of each groove is unobstructed and unswerving, the width and pitch of said serrations being small as compared to the mean width of said ribs.

JAMES E. HALE.